US 11,588,414 B2

(12) United States Patent
Virta et al.

(10) Patent No.: US 11,588,414 B2
(45) Date of Patent: Feb. 21, 2023

(54) METHOD FOR OPERATING CONVERTER AND CONVERTER ARRANGEMENT

(71) Applicant: ABB Schweiz AG, Baden (CH)

(72) Inventors: Antti Virta, Helsinki (FI); Antti Vilhunen, Helsinki (FI); Peter Muszynski, Helsinki (FI)

(73) Assignee: ABB Schweiz AG, Baden (CH)

( * ) Notice: Subject to any disclaimer, the term of this patent is extended or adjusted under 35 U.S.C. 154(b) by 16 days.

(21) Appl. No.: 16/914,736

(22) Filed: Jun. 29, 2020

(65) Prior Publication Data
US 2020/0412275 A1 Dec. 31, 2020

(30) Foreign Application Priority Data
Jun. 28, 2019 (EP) .................................... 19183311

(51) Int. Cl.
*H02M 7/5387* (2007.01)
*H02J 3/38* (2006.01)

(52) U.S. Cl.
CPC .......... *H02M 7/5387* (2013.01); *H02J 3/381* (2013.01); *H02J 2300/22* (2020.01); *H02J 2300/28* (2020.01)

(58) Field of Classification Search
CPC .................................................. H02M 7/5387
See application file for complete search history.

(56) References Cited

U.S. PATENT DOCUMENTS

| 2013/0057236 A1* | 3/2013 | Hsu ......................... H02J 3/383 323/268 |
| 2013/0182477 A1* | 7/2013 | De Brabandere ....... H02J 3/381 363/95 |
| 2016/0139643 A1* | 5/2016 | Hasler ...................... G06F 1/26 700/297 |
| 2019/0190276 A1* | 6/2019 | Liu .......................... H02J 3/46 |

OTHER PUBLICATIONS

European Patent Office, Extended Search Report issued in corresponding Application No. 19183311.0, dated Jan. 3, 2020, 7 pp.
Marggraf et al., "Experimental and Field Tests of Autonomous Voltage Control in German Distribution Grids," 2018 IEEE PES Innovative Smart Grid Technologies Conference Europe (ISGT-Europe), Oct. 21, 2018, pp. 1-6.
Mirhosseini et al., "Individual Phase Current Control With the Capability to Avoid Overvoltage in Grid-Connected Photovoltaic Power Plants Under Unbalanced Voltage Sags," IEEE Transactions on Power Electronics, vol. 30, No. 10, Oct. 2015, pp. 5346-5351.

* cited by examiner

*Primary Examiner* — Daniel Kessie
(74) *Attorney, Agent, or Firm* — Leydig, Voit & Mayer, Ltd.

(57) ABSTRACT

A method for operating an electric power converter and an electric power converter configured to convert DC power into AC power supplied to a three-phase AC network, conclude, during the converting, that a single-phase tripping has started in the three-phase AC network connected to the three-phase output of the converter, and after the concluding that the single-phase tripping has started in the three-phase AC network, control an active current in the three-phase (Continued)

output of the converter such that a negative sequence voltage in the three-phase output of the converter remains at or below a predetermined level, wherein the converter is configured to perform the controlling until concluding that the single-phase tripping has ended in the three-phase AC network.

16 Claims, 3 Drawing Sheets

METHOD FOR OPERATING CONVERTER AND CONVERTER ARRANGEMENT

FIELD OF THE INVENTION

The invention relates to a method for operating a converter, and to a converter arrangement.

BACKGROUND OF THE INVENTION

Electric power converters are devices that enable conversion of electric energy between AC (alternating current) and DC (direct current) and/or from one voltage level to another and/or from one frequency to another, for example. Examples of such electric power converters include a rectifier, an inverter and a frequency converter, for example.

As an example, an inverter is an electrical device enabling conversion of DC power from a DC power source to AC power. The term 'inverter' generally refers to an electronic device or circuitry that is able to convert direct current to alternating current. An example of the inverter is a semiconductor bridge implemented by means of controllable semiconductor switches, such as IGBTs (Insulated-gate Bipolar Transistor) or FETs (Field-Effect Transistor), which are controlled according to a modulation or control scheme used.

One example of an electric system comprising an inverter is a photovoltaic system, such as a photovoltaic power plant or generator, in which one or more photovoltaic panels supply DC power to an inverter which converts the DC power to AC power, which may further be supplied to various AC loads via an AC network, for example. Large photovoltaic power plants may comprise a plurality of parallel inverters each receiving DC power from an array of photovoltaic panels. Another example of an electric system comprising an inverter is a wind power generation system, such as a wind farm, which may comprise several wind generators, driven by wind turbines, supplying DC power to an inverter which converts the DC power to AC power further supplied to various AC loads via an AC network, for example.

Single-pole (or phase) auto-reclose, SPAR, (or alternatively SPTR, single-pole tripping and reclosing) is a protection scheme for an AC power transmission line. When a fault occurs in a transmission line of a power grid, the transmission line can be taken out of service to isolate the fault. This, however, may adversely affect the power transfer capability of the power grid. In case of a single-phase-to-ground fault, it is possible to isolate the fault by switching only the faulted phase out of service. This way the affected transmission line can retain a significant portion of its power transmission capability for the duration of the fault. Typically, there is a pre-determined time after which the reclosing is attempted in a SPAR scheme.

A problem related to the above-described SPAR protection functionality is that in certain conditions a SPAR event taking place in an electrical power grid may significantly change the grid characteristics seen by a converter connected to the grid, which may cause instability and result in an overvoltage tripping of the converter. As an example, in a scenario where a wind park, or any corresponding power generation system, is connected to an electrical power grid via a single transmission line (i.e. a radial connection), during a SPAR event, when a grid impedance perceived by a converter of the power generation system may be relatively high and a zero sequence impedance low, positive sequence current may increase a negative sequence voltage, which in turn may result in critically high phase voltages in the converter output terminals risking the converter to trip. It is, however, desirable that the converter will 'ride through' also the SPAR event, i.e. not trip.

BRIEF DESCRIPTION OF THE INVENTION

The object of the invention is thus to provide a method and an apparatus for implementing the method so as to solve or at least alleviate the above problem or at least to provide an alternative solution. The object of the invention is achieved with a method, a computer program product, an arrangement and a control system that are characterized by what is stated in the independent claims. Preferred embodiments of the invention are described in the dependent claims.

The invention is based on the idea of controlling, during a concluded SPAR event, an active current in the three-phase output of the converter such that the negative sequence voltage in the three-phase output of the converter remains at or below a predetermined level.

An advantage of the solution of the invention is that an unnecessary tripping of the converter due to the SPAR event may be avoided and the power transfer capability of the converter can be better optimized. Also and end of the SPAR event in certain conditions can be concluded and the active power can be ramped up after the end of the SPAR-event.

BRIEF DESCRIPTION OF THE FIGURES

In the following, the invention will be described in more detail in connection with preferred embodiments and with reference to the accompanying drawings, in which.

DETAILED DESCRIPTION OF THE INVENTION

The application of the various embodiments described herein is not limited to any specific system, but they can be used in connection with various electric systems. Moreover, the use of the various embodiments described herein is not limited to systems employing any specific fundamental frequency or any specific voltage level, for example.

Figure 1:
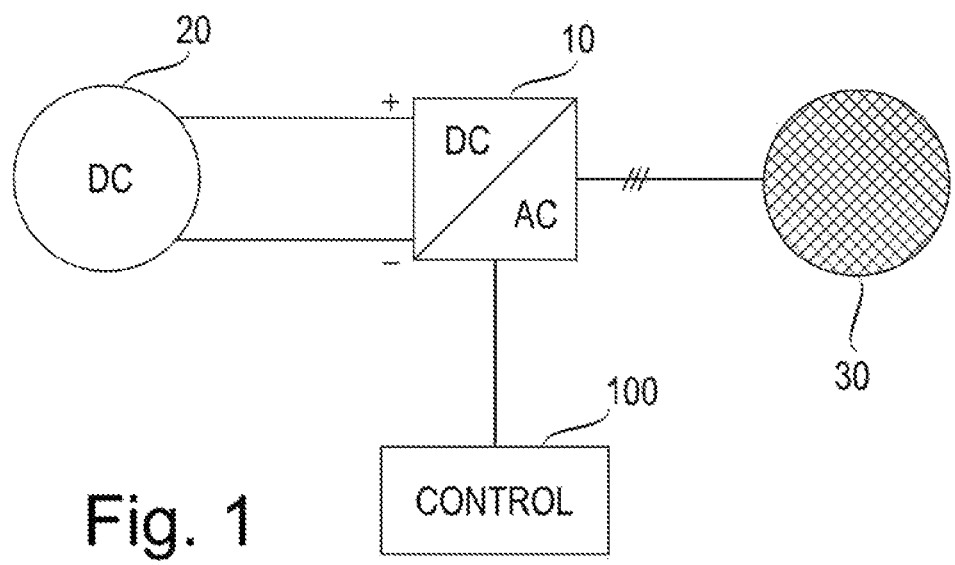
FIG. 1 illustrates an example of an electric system according to an embodiment.

FIG. 1 illustrates a simplified example of an electric system. The figure shows only components necessary for understanding the various embodiments. The exemplary system of FIG. 1 comprises an electric power converter 10 which in this example can operate at least as an inverter (DC to AC converter). The exemplary converter 10 may also be able to operate as a rectifier (AC to DC converter). The converter 10 may be configured to operate as a single-stage inverter or as a multi-stage inverter and hence comprising two or more converter stages. A DC input +, − of the converter 10 may be connected to a DC power source 20 as illustrated. An example of a DC power source 20 is a photovoltaic (PV) power generation system comprising one or more photovoltaic panels. Another example of a possible DC power source 20 is a wind power generation system, such as a wind farm, which may comprise one or more wind generators, driven by one or more wind turbines, for instance. Other type(s) of DC power source(s) or combinations thereof could also be utilized such as a fuel cell DC power source. There may be one or more switches (not shown) between the converter 10 and the DC power source 20 enabling the connection and disconnection of the converter to/from the DC power source. Further, an AC output of the converter 10 may be connected to an AC network 30, such as a public electrical grid or another kind of AC network, in order to supply power from the DC power source 20 to the AC network 30, when the electric system is in normal operation. There may be one or more switches (not shown) between the electric system and the AC network 30, enabling the connection and disconnection of the electric system to/from the AC network 30. The AC connection between the converter 10 and the AC network 30 may be a three-phase AC connection as illustrated, for example. There could also be one or more transformers or converters or other devices or components (not shown in the figure) connected between the AC output of the converter 10 and the AC network 30, for example.

The exemplary system of FIG. 1 further comprises a control arrangement for the converter 10, which exemplary control arrangement comprises a control unit 100. There could be more than one such control units in the control arrangement. While this exemplary control unit has been illustrated as a separate unit, the one or more control units or generally the functionality of the control arrangement, could be included within the converter 10. The functionality according to the various embodiments described herein may be implemented at least partly by means of the control unit 100 for the converter 10. Moreover, the control unit 100 may further control the normal operation of the converter 10 according to a modulation scheme used, for example. According to an embodiment, the normal operation of the converter 10 may include converting by the converter 10 DC power into AC power supplied to the three-phase AC network 30 connected to the three-phase output the converter. During the converting, an output of the converter 10 may be controlled on the basis of at least an active power reference of the converter, or on the basis of the active power reference of the converter and a reactive power reference of the converter, for example. Moreover, during the converting an output current of the converter 10 may be controlled on the basis of an active current reference of the converter and a reactive current reference of the converter. It is also possible to use other types of control methods for controlling the output of the converter, which may include control on the basis of a torque reference of the converter or on the basis of a DC reference of the converter or any combination thereof, for instance. Within this disclosure the control of an output current of the converter 10 may include a direct control of the output current of the converter 10 via a current reference of the converter and/or an indirect control of the output current of the converter 10 via one or more other references affecting the output of the converter, for example.

Figure 2:
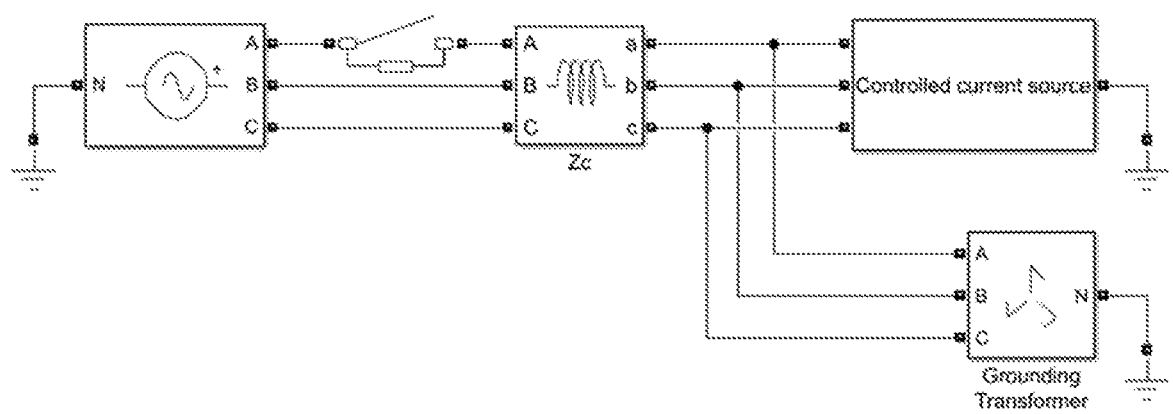
FIG. 2 illustrates an example of a circuit diagram.

FIG. 2 illustrates an exemplary circuit diagram, which can be used for analysing a behaviour of a converter during a SPAR event in a reduced scenario to understand the converter—grid interactions. The exemplary reduced scenario consists of a grid voltage source, a series impedance $Z_C$, a grounding transformer and a simplified converter model. A converter is modelled as a controlled current source. The grounding transformer is used to provide a parametrizable impedance path for zero sequence fault currents to ground. The SPAR event is realized as opening one phase between the grid voltage source and the grid series impedance as illustrated in the figure.

When a single phase is opened, the phase voltages over the fault location are:

$V_a = U_{f,ph}$, $V_b = 0$, $V_c = 0$

Transforming the voltages to sequence domain according to the method of symmetrical components yields:

$$\begin{bmatrix} V_0 \\ V_1 \\ V_2 \end{bmatrix} = \frac{1}{3}\begin{bmatrix} 1 & 1 & 1 \\ 1 & \alpha & \alpha^2 \\ 1 & \alpha^2 & \alpha \end{bmatrix}\begin{bmatrix} U_{f,ph} \\ 0 \\ 0 \end{bmatrix} = \frac{1}{3}\begin{bmatrix} U_{f,ph} \\ U_{f,ph} \\ U_{f,ph} \end{bmatrix} = \begin{bmatrix} U_F \\ U_F \\ U_F \end{bmatrix}.$$

Figure 3:
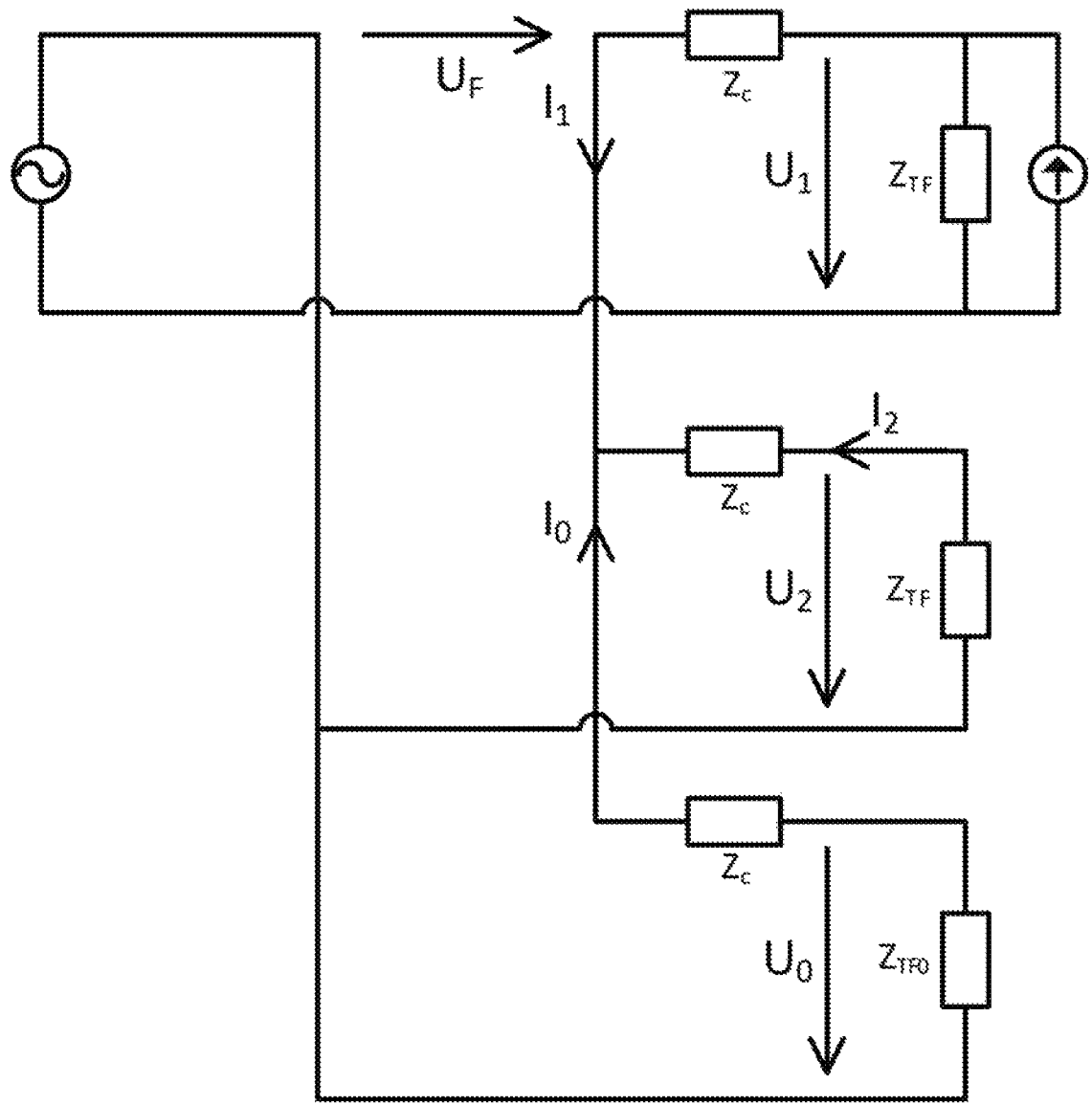
FIG. 3 illustrates an example of sequence networks.

That is, the voltage over the fault location is the same in all the sequences, $U_F$. This means that the sequence networks, i.e. the positive sequence, the negative sequence, and the zero sequence network, are connected in parallel with respect to the fault location. The sequence networks and their mutual connections in the exemplary situation are shown in FIG. 3. In the example, the converter is assumed to inject only positive sequence currents to the network. Thus, it is present only in the positive sequence network as a current source. In the negative sequence and zero sequence networks the converter is modelled as an open circuit and thus omitted from the figure.

The following relations can be derived from the sequence networks (subscripts 0, 1, and 2 refer to the zero, positive, and negative sequence quantities, respectively):

$$I_1 + I_2 + I_0 = 0, \tag{1}$$

$$Z_0 = Z_c + Z_{TF0}, \tag{2}$$

$$Z_2 = Z_c + Z_{TF}, \tag{3}$$

$$U_F = \frac{Z_0 Z_2}{Z_2 + Z_0} I_1 = \frac{(Z_c + Z_{TF0})(Z_c + Z_{TF})}{(Z_c + Z_{TF0}) + (Z_c + Z_{TF})} I_1, \tag{4}$$

$$U_2 = \frac{Z_{TF}}{Z_c + Z_{TF}} U_F, \tag{5}$$

$$I_2 = \frac{U_2}{Z_{TF}} = \frac{1}{Z_c + Z_{TF}} U_F, \tag{6}$$

$$U_0 = \frac{Z_{TF0}}{Z_C + Z_{TF0}} U_F, \tag{7}$$

$$I_0 = \frac{U_0}{Z_{TF0}} = \frac{1}{Z_C + Z_{TF0}} U_F. \tag{8}$$

Combining equations (4) and (5), a relationship for the negative sequence voltage and the converter positive sequence current injection can be obtained:

$$\begin{aligned} U_2 &= \frac{Z_{TF}}{Z_c + Z_{TF}} U_F \\ &= \frac{Z_{TF}}{Z_c + Z_{TF}} \frac{(Z_C + Z_{TF0})(Z_c + Z_{TF})}{(Z_C + Z_{TF0}) + (Z_c + Z_{TF})} I_1 \\ &= Z_{TF} \frac{(Z_C + Z_{TF0})}{(Z_C + Z_{TF0}) + (Z_c + Z_{TF})} I_1 \end{aligned} \tag{9}$$

Similarly for the zero sequence voltage from equations (4) and (7):

$$U_o = \frac{Z_{TF0}}{Z_c + Z_{TF0}} U_F \qquad (10)$$

$$= \frac{Z_{TF0}}{Z_C + Z_{TF0}} \frac{(Z_C + Z_{TF0})(Z_C + Z_{TF})}{(Z_C + Z_{TF0}) + (Z_C + Z_{TF})} I_1$$

$$= Z_{TF0} \frac{(Z_C + Z_{TF})}{(Z_C + Z_{TF0}) + (Z_c + Z_{TF})} I_1$$

Since the magnetizing inductance of the grounding transformer is significantly larger than the grid series impedance $Z_C$, the negative sequence voltage and current can be approximated based on equations (5) and (6):

$$Z_{TF} \gg Z_c \rightarrow \begin{cases} U_2 \approx U_F \\ I_2 \approx 0 \end{cases} \qquad (11)$$

The behavior of the zero sequence voltage and current depend on the grounding impedance of the transformer. If the zero sequence impedance is low, then from equations (7) and (8) it follows:

$$Z_{TF0} \approx 0 \rightarrow \begin{cases} U_0 \approx 0 \\ I_0 \approx U_F/Z_c \end{cases} \qquad (12)$$

In this case the negative sequence voltage can be further simplified to:

$$U_2 = Z_{TF} \frac{(Z_C + Z_{TF0})}{(Z_C + Z_{TF0}) + (Z_C + Z_{TF})} I_1 \approx \frac{Z_{TF} Z_C}{2Z_C + Z_{TF}} I_1 \approx Z_C I_1 \qquad (13)$$

In systems without low impedance grounding of the start point, i.e. $Z_{TF0} \gg 0$, the positive sequence current injection will additionally increase the zero sequence voltage and the sequence fault voltage $U_F$ during the SPAR event. The elevated sequence fault voltage will additionally increase both the negative sequence and the zero sequence voltages seen at the converter. These, in turn, give rise to elevated phase voltage(s) which may exceed the DC power source or converter trip voltages for self-protection, for example.

As a summary, during a SPAR event the converter injecting a positive sequence current will increase the negative sequence voltage. The magnitude of the voltage increase depends on the magnitude of grid impedance, $Z_C$ (eq. 13). Thus, in order to avoid the converter tripping because of overvoltage, the converter positive sequence current injection should preferably be regulated.

According to an embodiment, the converter 10 may be operated such that DC power is converted with the converter into AC power supplied to the three-phase AC network 30 connected to a three-phase output the converter 10. During the converting, it may be concluded that a single-phase tripping has started in the three-phase AC network 30 connected to the three-phase output of the converter 10 may be detected. According to an embodiment, the concluding that the single-phase tripping has started in the three-phase AC network may be performed on the basis of a voltage unbalance in the three-phase AC network or a quantity indicative thereof, for example. According to an embodiment, the start of the single-phase tripping in the three-phase AC network may be concluded such that first a voltage unbalance in the three-phase AC network 30 exceeding a predetermined magnitude is detected, and subsequently it is detected that the voltage unbalance in the three-phase AC network 30 decreases back below the predetermined magnitude. According to an embodiment, the voltage unbalance in the three-phase AC network 30 can be determined on the basis of phase voltages in the three-phase output of the converter, for example. According to an embodiment, the voltage unbalance in the three-phase AC network 30 can be determined on the basis of the negative sequence voltage of the three-phase AC network and/or on the basis of instantaneous values of all the phase voltages. Generally, a level of the voltage unbalance in the three-phase AC network 30 can be determined directly on the basis of phase voltages in the three-phase AC network 30, or indirectly on the basis of one or more quantities indicative of the phase voltages in the three-phase AC network 30 and/or one or more quantities indicative of the voltage unbalance in the three-phase AC network 30. According to an embodiment, the concluding that the single-phase tripping has started in the three-phase AC network may be performed on the basis of an indication received, for example. Such an indication indicating the start of the single-phase tripping in the three-phase AC network could be received by the converter 10, and/or by the control unit 100 thereof, and provided or sent by some other entity e.g. in the three-phase AC network 30. Such entity providing such an indication could be a protection unit or system, or a part thereof, in the three-phase AC network 30, which performs and/or controls various protection functionalities in the three-phase AC network 30, and which knows or can detect if a single-phase tripping in the three-phase AC network 30 has been conducted, for example. According to an embodiment, the concluding that the single-phase tripping has started in the three-phase AC network may be generally performed on the basis of or in response to detecting conditions that enable the start of the single-phase tripping in the three-phase AC network. The concluding that the single-phase tripping has started in the three-phase AC network may also comprise any combination of the embodiments described above.

According to an embodiment, after the detecting of the start of the single-phase tripping in the three-phase AC network, an active current in the three-phase output of the converter 10 is controlled such that a negative sequence voltage in the three-phase output of the converter 10 remains at or below a predetermined level, wherein the controlling is performed until concluding that the single-phase tripping has ended in the three-phase AC network. Such controlling may be performed directly on the basis of the negative sequence voltage (e.g. by monitoring the value thereof) in the three-phase output of the converter 10 or indirectly on the basis of any quantity which is indicative of, or generally has a known relationship to, the negative sequence voltage in the three-phase output of the converter 10, for example. In response to concluding that the single-phase tripping has ended in the three-phase AC network, such controlling may be stopped and a normal control of the active current in the three-phase output of the converter 10 may be resumed either immediately or gradually, for instance. According to an embodiment, the concluding that the single-phase tripping has ended in the three-phase AC network may be performed on the basis of the negative sequence voltage in the three-phase output of the converter 10 or a quantity indicative thereof. As an example, if the negative sequence voltage with respect to the current in the three-phase output of the converter 10 goes below a predetermined level, while the current is kept essentially constant, it may be concluded that the single-phase tripping in the three-phase AC network has ended. According to an embodiment, the concluding that the single-phase tripping has ended in the three-phase AC network may be performed on the basis of an indication received. Such an indication indicating the end of the single-phase tripping in the three-phase AC network could be received by the converter 10, and/or by the control unit 100 thereof, and provided or sent by some other entity e.g. in the three-phase AC network 30. Such an entity providing such an indication could be a protection unit or system, or a part thereof, in the three-phase AC network 30, which performs and/or controls various protection functionalities in the three-phase AC network 30, and which knows or can detect if the single-phase tripping conducted in the three-phase AC network 30 has ended, for example. According to an embodiment, the concluding that the single-phase tripping has ended in the three-phase AC network may be performed on the basis of an elapsed time from the detection of the start of the single-phase tripping in the three-phase AC network. If the length of the tripping time used for a single-phase tripping in the three-phase AC network 30 is predetermined or known otherwise, it is possible to determine the and hence conclude the end of the single-phase tripping by calculating the elapsed time from the concluding that the single-phase tripping has started until the known length of the tripping time is reached, for example. According to an embodiment, the concluding that the single-phase tripping has ended in the three-phase AC network may be generally performed on the basis of or in response to detecting conditions that enable the end of the single-phase tripping in the three-phase AC network. The concluding that the single-phase tripping has ended in the three-phase AC network may also comprise any combination of the embodiments described above.

According to an embodiment, said controlling of the active current in the three-phase output of the converter 10, after the concluding that the single-phase tripping has started in the three-phase AC network, may comprise controlling the active current in the three-phase output of the converter 10 to its maximum level available, or to a predetermined fraction of its maximum level available, such that the negative sequence voltage in the three-phase output of the converter 10 remains at or below the predetermined level. Thus, an object may be to maximize the active current in the three-phase output of the converter 10 or to control it to a predetermined fraction of the maximum level available when the negative sequence voltage in the three-phase output of the converter 10 remains at or below the predetermined level. Then, at a given time the maximum level available may be limited and hence determined e.g. by the negative sequence voltage in the three-phase output of the converter 10 or by the current output capability of the converter whichever sets a lower limit for the active current output from the three-phase output of the converter 10.

According to an embodiment, said controlling of the active current in the three-phase output of the converter 10, after the concluding that the single-phase tripping has started in the three-phase AC network, may be started essentially immediately after the detecting of the start of the single-phase tripping in the three-phase AC network. Thus, the controlling may be started directly in response to the concluding that the single-phase tripping has started in the three-phase AC network. According to another embodiment, said controlling of the active current in the three-phase output of the converter 10, after the concluding that the single-phase tripping has started in the three-phase AC network, may be started after a predetermined time after the concluding that the single-phase tripping has started in the three-phase AC network. The predetermined time may be about 100 ms or more, for example. The predetermined time used may be determined or selected according to the system characteristics, for instance, and may thus vary and depend on the system in which the embodiments are implemented in. According to an embodiment, for the duration of said predetermined time after the concluding that the single-phase tripping has started in the three-phase AC network, the active current and a reactive current in the three-phase output of the converter 10 are controlled to predetermined values. According to an embodiment, the predetermined values for the active current and the reactive current are both zero but it also possible to use other values which are low enough to minimize the risk of a transient overvoltage, for example.

Figure 4:
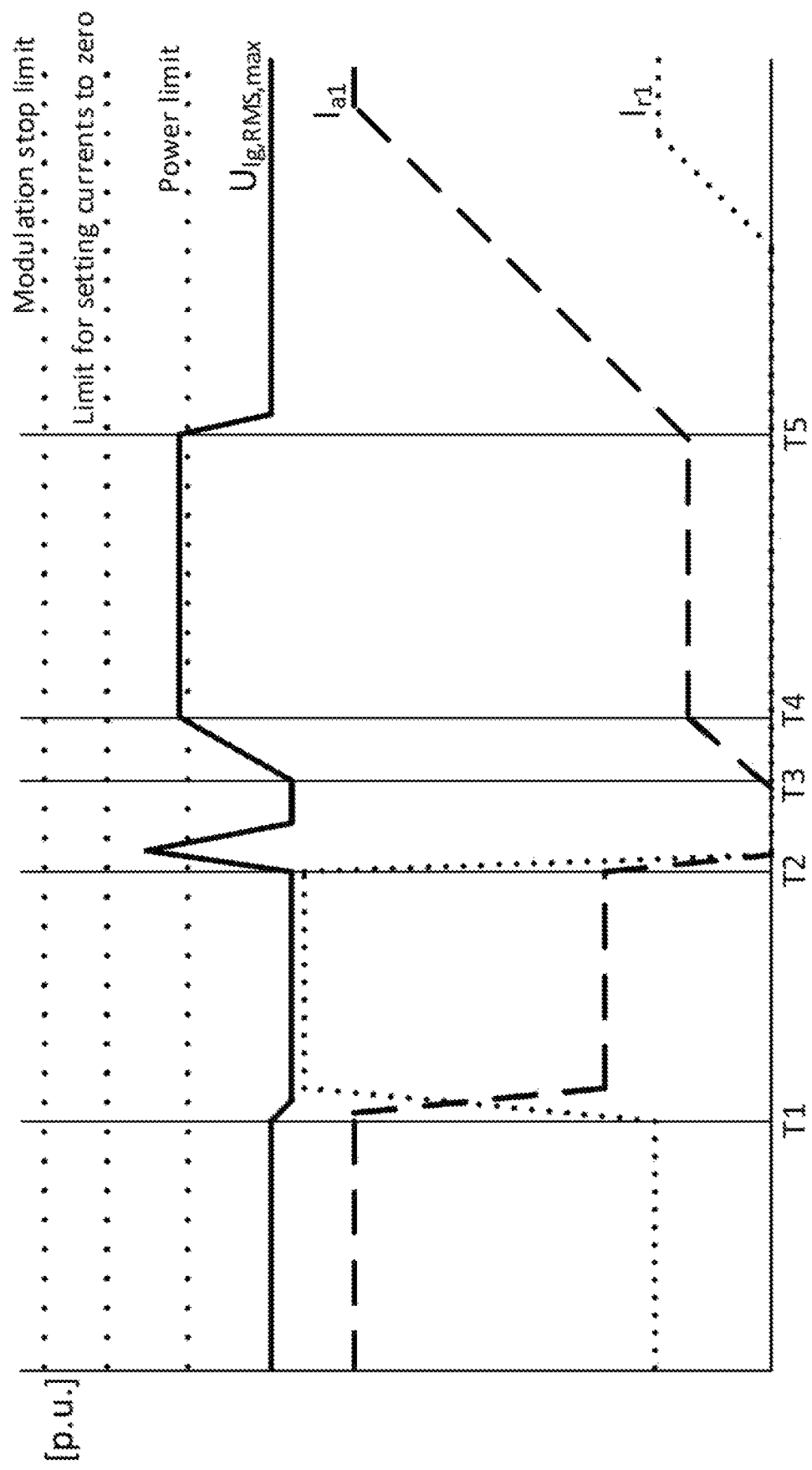
FIG. 4 illustrates a diagram according to an embodiment.

FIG. 4 shows an exemplary diagram illustrating a possible operation of the converter 10 according to an embodiment. In the figure, $I_{a1}$ shows the active current reference of the converter, $I_{r1}$ shows the reactive current reference of the converter and $U_{lg,RMS,max}$ shows a maximum value of the phase voltage in the three-phase output of the converter. The actions taking place during time events T1 to T5 are described below:

At time T1: The converter 10 detects the beginning of an asymmetric dip, i.e. a voltage unbalance in the three-phase AC network exceeding a predetermined magnitude, which may result from a single-phase to ground fault occurring in the AC network 30. The detection can be done in various ways as explained above. As an example, the measured negative sequence voltage of the AC network 30 increasing above a predetermined threshold value can trigger the detection, or one of the instantaneous phase voltage magnitudes going outside a predetermined margin can trigger the detection. According to an embodiment, the converter may perform default FRT (Fault Ride Through) functionality in response to detecting the unbalance in the three-phase AC network.

At time T2: The converter detects the end of the asymmetric dip, which may result from the faulted phase of the faulted transmission line in the AC network 30 being switched off as a result of the SPAR functionality employed in the network 30. The detection can be done in various ways as explained above. As an example, the measured negative sequence voltage of the AC network 30 decreasing below the predetermined threshold value can trigger the detection, or all the instantaneous phase voltage magnitudes being inside a predetermined margin can trigger the detection. As a response to the end of the asymmetric dip it can be determined and hence concluded that a single-phase tripping in the three-phase AC network 30 connected to the three-phase output of the converter has started. Then, in response to concluding that the single-phase tripping has started in the three-phase AC network 30 the active current reference $I_{a1}$ and the reactive current reference $I_{r1}$ of the converter are set to zero for the predetermined time, which may be about 100 ms, to minimize the risk of a transient overvoltage. According to an embodiment, the maximum phase RMS voltage signal, $U_{lg,RMS,max}$, or a quantity indicative thereof, may be additionally monitored, and in response to the voltage exceeding a predetermined threshold (threshold "Modulation stop limit" in FIG. 4), the modulation of the converter may be stopped to protect the converter hardware for the remaining duration of the SPAR event.

At time T3: the converter current references $I_{a1}$, $I_{r1}$ have been zeroed for the predetermined time, after which the converter current references are released. As a result, the active power of the converter can be ramped up and thus the controlling of the active current in the three-phase output of the converter 10 such that the negative sequence voltage in the three-phase output of the converter 10 remains at or below a predetermined level.

At time T4: The active power reference of the converter is frozen to the constant value in response to the maximum phase voltage $U_{lg,RMS,max}$ exceeding a predetermined threshold (threshold "Power limit" in FIG. 4). Instead of the active power reference, an active current reference or both the active and reactive current references could be frozen, for example. As a result, the active current in the three-phase output of the converter 10 is controlled such that the negative sequence voltage in the three-phase output of the converter 10 remains at or below a predetermined level. Thus, in this example the controlling is based on the maximum phase voltage $U_{lg,RMS,max}$, which is used as an indicator of the negative sequence voltage in the three-phase output of the converter 10. The maximum phase voltage in this example could thus be replaced with any quantity or corresponding signal, in which an increase of the negative sequence voltage, and optionally zero sequence voltage, can be detected. According to an embodiment, in addition to the modulation stop threshold, a second predetermined threshold (threshold "Limit for setting currents to zero" in FIG. 4) may be set below the modulation stop threshold such that current references $I_{a1}$, $I_{r1}$ are set to zero in response to the maximum phase RMS voltage signal, $U_{lg,RMS,max}$, or a quantity indicative thereof exceeding this predetermined threshold.

At time T5: The monitored phase voltage $U_{lg,RMS,max}$ goes below the predetermined threshold, which may result from the disconnected single phase of the transmission line being reconnected again, i.e. it can be determined and hence concluded that the single-phase tripping in the three-phase AC network has ended. The active power reference is then released from the constant value in response to the concluding that the single-phase tripping has ended in the three-phase AC network.

The control arrangement 100 or other means controlling the converter according to any one of the embodiments herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 100 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g. measurement and/or control data, and output means for outputting e.g. control or other data. It is also possible to use a specific integrated circuit or circuits, or discrete electric components and devices for implementing the functionality according to any one of the embodiments.

The invention may be implemented in existing electric system components such as converter devices. Present converter devices may comprise processors and memory that may be utilized in the functions according to the various embodiments described herein. Thus, all modifications and configurations required for implementing an embodiment in existing electric system components, such as converter devices, may be performed as software routines, which may be implemented as added or updated software routines. If at least part of the functionality of the invention is implemented by software, such software may be provided as a computer program product comprising computer program code which, when run on a computer controlling a converter, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for operating an electric power converter, the method comprising:
converting, by the converter, DC power into AC power supplied to a three-phase AC network connected to a three-phase output of the converter, wherein the three-phase AC network is associated with one or more single-phase tripping devices that performs a single-phase tripping by switching off a single phase of a transmission line in the three-phase AC network connected to the three-phase output of the converter;
determining, during the converting, that the single-phase tripping has started in the three-phase AC network connected to the three-phase output of the converter, wherein determining the single-phase tripping has started is in response to:
a) detecting that a voltage unbalance in the three-phase AC network exceeds a predetermined magnitude, and
b) subsequent to a), detecting that the voltage unbalance in the three-phase AC network decreases back below the predetermined magnitude; and
after determining that the single-phase tripping has started in the three-phase AC network, directly controlling an active output current in the three-phase output of the converter such that a negative sequence voltage in the three-phase output of the converter remains at or below a predetermined level, wherein the controlling is performed until determining that the single-phase tripping has ended in the three-phase AC network.

2. The method of claim 1, wherein said controlling of the active output current in the three-phase output of the converter comprises controlling the active output current in the three-phase output of the converter to its maximum level available, or to a predetermined fraction of its maximum level available, such that the negative sequence voltage in the three-phase output of the converter remains at or below the predetermined level.

3. The method of claim 1, wherein said controlling of the active output current in the three-phase output of the converter is started essentially immediately after the determining that the single-phase tripping has started in the three-phase AC network or after a predetermined time after the determining that the single-phase tripping has started in the three-phase AC network.

4. The method of claim 3, wherein for the duration of said predetermined time after the determining that the single-phase tripping has started in the three-phase AC network the active output current and a reactive current in the three-phase output of the converter are controlled to predetermined values.

5. The method of claim 1, wherein determining that the single-phase tripping has ended the three-phase AC network is performed on the basis of the negative sequence voltage in the three-phase output of the converter or a quantity indicative thereof, on the basis of an indication received, or on the basis of an elapsed time from the determining that the single-phase tripping has started in the three-phase AC network.

6. The method of claim 1, further comprising:
receiving, from a device in the three-phase AC network, an indication indicating the start of the single-phase tripping in the three-phase AC network, and
wherein determining that the single-phase tripping has started in the three-phase AC network is based on receiving the indication.

7. The method of claim 1, wherein detecting the voltage unbalance in the three-phase AC network exceeds the predetermined magnitude comprises determining a measured negative sequence voltage of the three-phase AC network has increased above a predetermined threshold value.

8. A computer program product comprising computer program code embodied on a non-transitory computer readable medium, wherein execution of the program code in a computer controlling a converter comprises:
convert, by the converter, DC power into AC power supplied to a three-phase AC network connected to a three-phase output of the converter, wherein the three-phase AC network is associated with one or more single-phase tripping devices that performs a single-phase tripping by switching off a single phase of a transmission line in the three-phase AC network connected to the three-phase output of the converter;
determine, during the converting, that the single-phase tripping has started in the three-phase AC network connected to the three-phase output of the converter, wherein determining the single-phase tripping has started is in response to:
a) detecting that a voltage unbalance in the three-phase AC network exceeds a predetermined magnitude, and
b) subsequent to a), detecting that the voltage unbalance in the three-phase AC network decreases back below the predetermined magnitude; and
after determining that the single-phase tripping has started in the three-phase AC network, directly control an active output current in the three-phase output of the converter such that a negative sequence voltage in the three-phase output of the converter remains at or below a predetermined level, wherein the controlling is performed until determining that the single-phase tripping has ended in the three-phase AC network.

9. An arrangement comprising:
an electric power converter with a three-phase output; and
a controller configured to:
control the converter to convert DC power into AC power supplied to a three-phase AC network connected to the three-phase output converter, wherein the three-phase AC network is associated with one or more single-phase tripping devices that performs a single-phase tripping by switching off a single phase of a transmission line in the three-phase AC network connected to the three-phase output of the converter;
determine, during the converting, that the single-phase tripping has started in the three-phase AC network connected to the three-phase output of the converter, wherein determining the single-phase tripping has started is in response to:
a) detecting that a voltage unbalance in the three-phase AC network exceeds a predetermined magnitude, and
b) subsequent to a), detecting that the voltage unbalance in the three-phase AC network decreases back below the predetermined magnitude; and
after determining that the single-phase tripping has started in the three-phase AC network, directly control an active output current in the three-phase output of the converter such that a negative sequence voltage in the three-phase output of the converter remains at or below a predetermined level, wherein the controller is configured to perform the controlling until determining that the single-phase tripping has ended in the three-phase AC network.

10. The arrangement of claim 9, wherein the controller is configured to perform said controlling of the active output current in the three-phase output of the converter by controlling the active output current in the three-phase output of the converter to its maximum level available, or to a predetermined fraction of its maximum level available, such that the negative sequence voltage in the three-phase output of the converter remains at or below the predetermined level.

11. The arrangement of claim 9, wherein the controller is configured to start said controlling of the active output current in the three-phase output of the converter essentially immediately after the determining that the single-phase tripping has started in the three-phase AC network or after a predetermined time after the determining that the single-phase tripping has started in the three-phase AC network.

12. The arrangement of claim 11, wherein the controller is configured to control the active output current and a reactive current in the three-phase output of the converter to predetermined values for the duration of said predetermined time after the determining that the single-phase tripping has started in the three-phase AC network.

13. The arrangement of claim 9, wherein the controller is configured to perform the determining that the single-phase tripping has ended in the three-phase AC network on the basis of the negative sequence voltage in the three-phase output of the converter or a quantity indicative thereof, on the basis of an indication received, or on the basis of an elapsed time from the determining that the single-phase tripping has started in the three-phase AC network.

14. The arrangement of claim 9, comprising a DC power source connected to the converter.

15. The arrangement of claim 14, wherein the DC power source comprises one or more wind generators and/or one or more photovoltaic panels.

16. A control system for an electric power converter, the control system comprising a processor, and a memory storing instructions that, when executed by the processor, cause the processor to carry out the steps of:

control the converter to convert DC power into AC power supplied to a three-phase AC network connected to a three-phase output the converter, wherein the three-phase AC network is associated with one or more single-phase tripping devices that performs a single-phase tripping by switching off a single phase of a transmission line in the three-phase AC network connected to the three-phase output of the converter;

determine, during the converting, that the single-phase tripping has started in the three-phase AC network connected to the three-phase output of the converter, wherein determining the single-phase tripping has started is in response to:
  a) detecting that a voltage unbalance in the three-phase AC network exceeds a predetermined magnitude, and
  b) subsequent to a), detecting that the voltage unbalance in the three-phase AC network decreases back below the predetermined magnitude; and after concluding after determining that the single-phase tripping has started in the three-phase AC network, directly control an active output current in the three-phase output of the converter such that a negative sequence voltage in the three-phase output of the converter remains at or below a predetermined level, wherein the controlling is performed until determining that the single-phase tripping has ended in the three-phase AC network.

\* \* \* \* \*